United States Patent Office 3,004,995
Patented Oct. 17, 1961

3,004,995
STEROID COMPOUNDS
Alan Gibson Long, Greenford, and Stephen Eardley, Ruislip, England, assignors to Glaxo Laboratories Limited, Greenford, England, a company of Great Britain
No Drawing. Filed Dec. 28, 1959, Ser. No. 862,068
Claims priority, application Great Britain Jan. 8, 1959
14 Claims. (Cl. 260—397.45)

This invention is concerned with the preparation of 16:17-dehydro-20-oxo-steroids from the corresponding 17-hydroxy-20-oxo-steroids.

Various 16:17-dehydro-20-oxo-steroids are important compounds in that they represent intermediates of value in the preparation of potent anti-inflammatory hormones, e.g. 16-methyl or 16-hydroxy derivatives of cortisone and prednisone. It has been proposed to prepare these 16:17-dehydro-20-oxo-compounds from the corresponding 17-hydroxy-20-oxo steroids by removal of the elements of water, either directly or by first blocking the 20-oxo group (e.g. by ketalisation or semicarbazone formation) which is subsequently regenerated. These attempts have met with varied success both as regards to yield and to quality of product.

We have now found that, in the preparation of 16:17-dehydro-20-oxo steroids from the corresponding 17-hydroxy-20-oxo compounds, improved results, particularly with regard to yield, are obtained by protection of the 20-oxo group by formation of alkoxyimino derivatives thereof.

According to the invention, therefore, there is provided a process for the preparation of 16:17-dehydro-20-oxo steriods by dehydrating 17-hydroxy-20-oxo steriods in which, prior to dehydration, the 20-oxo group is protected by formation of an alkoxyimino derivative thereof.

The 20-oxo group is preferably protected by reaction with an alkoxyamine containing 1–4 carbon atoms, e.g. methoxyamine. The formation of the 20-alkoxyimino compound is preferably brought about by using the procedure described in British patent specification No. 811,632 i.e. by reacting a 17-hydroxy-20-oxo steroid with a salt of a compound $H_2NOR$, where R is an alkyl group containing 1–4 carbon atoms, in the presence of a tertiary amine having a pKa value of not greater than 7.6. The reaction is preferably carried out in a homogeneous liquid phase and the tertiary amine is preferably water-miscible, e.g. pyridine.

Where the steroid starting material contains one or more other reactive oxo groups, such further groups may, if necessary, also be protected, in which case it may be advantageous not to convert such oxo groups to alkoxylimino groups, but to some other readily hydrolysable group where the formation of an alkoxyimino group at the position in question would be undesirable. Thus, for example, 3-alkoxylimino groups cannot readily be hydrolysed and, where a 3-oxo group is also to be protected, we prefer to form a 3-ketal derivative thereof which can subsequently be readily hydrolysed. In this case, it is generally convenient first to form the 3-ketal under conditions favouring the formation of a 3-ketal group in preference to a 20-ketal group, e.g., in the case of a 3:20-dioxo-21-acetoxy compound, by reaction with ethylene glycol in the presence of an acid catalyst with azeotropic removal of water and then to form the 20-alkoxyimino group as described above.

In general, where it is desired to prepare a compound fully saturated in ring A, prior protection of the 3-oxo group by ketalisation is preferable and, for example, in the preparation of 21-acetoxy-5α-pregn-16-ene-3:11:20-trione, it is best to carry out the present process using 21-acetoxy - 3:3 - ethylene-dioxy-17α-hydroxy - 20 - methoxyimino - 5α - pregnan - 11 - one as starting material. It should be noted, however, that, as stated above, protection of reactive oxo groups other than the 20-oxo group may well not be necessary and may even be undesirable.

In the preparation of compounds having a hydroxy group in positions 3, 11 and/or 21, these should generally be protected by acylation, e.g. acetylation, where further dehydration is not desired. However, if in the present process introduction of a further double bond is required, then such further dehydration may well also serve this purpose. Thus, for example, by leaving an 11β-hydroxy group unprotected $\Delta^{9(11):16}$ compounds can be obtained which serve as useful intermediates for the preparation of compounds substituted at both positions 9 and 16.

The removal of the elements of water from the 16:17-positions is preferably brought about by reacting the 20-alkoxyimino derivative with thionyl chloride in the presence of a tertiary organic base, such as pyridine, quinoline, collidine, N-methyl morpholine, or a di-N-substituted amide, e.g. dimethyl formamide or dimethyl acetamide.

It will be appreciated that the optimal conditions of dehydration vary according to the nature of the steroid starting material and dehydrating agent employed and optimal conditions can readily be determined in any given case by suitable preliminary experiments. In such experiments, the appearance of a maximum in the ultra-violet spectrum of the reaction product due to the introduction of unsaturation will aid in the recognition of the desired product, and, for example, in the case of a maximum in the region of 245 mμ is indicative of the presence of a $\Delta^{16}$-20-alkoxyimine compound. $\Delta^{16}$ compounds are also less polar than 17-hydroxy compounds and hence can be readily differentiated therefrom by paper chromatography. In general, the dehydration is conveniently effected at low temperatures, i.e. at temperatures below 4° C., the temperature of a solid carbon dioxide/acetone bath being generally satisfactory.

The subsequent hydrolysis of the 20-alkoxyimino group to reform the 20-oxo group is preferably brought about under mild conditions, e.g. using dilute acid. There is, however, a possibility that the alkoxyamine formed by hydrolysis will further react with other reactive oxo groups, e.g. 3-oxo groups, from which it cannot readily ber removed by hydrolysis. In order to diminish the possibility of this occurring, we prefer to carry out the hydrolysis in such circumstances in the presence of a carbonyl compound which will react more readily with the alkoxyamine than would, for example, a 3-oxo group. An example of such a compound is acetone, although other ketonic substances such as methyl ethyl ketone can be used if desired. It will be appreciated that the step of hydrolysis will, in general, also remove acyl groups protecting hydroxy groups but such acyl groups can, of course, be readily restored by reacylation. Thus, for example, where it is desired, as may often be the case, to produce a 21-acetate, a final step of acetylation will, in general, be necessary.

The 16:17-dehydro-20-oxo compound is thus obtained in good yield. Normally one will use the process according to the invention to form a 16:17-dehydro-20-oxo compound from the corresponding 17-hydroxy-20-oxo steroid. However, it should be noted that whilst the 20-oxo group and possibly other reactive oxo groups are protected, one can subject the intermediate at that stage to transformation at some other part of the molecule, e.g. reduction of an 11-oxo group to an 11-hydroxy group.

The formation of a 20-alkoxyimine, particularly a 20-methoxyimine, to protect the 20-oxo group offers important advantages. Firstly, 20-alkoxyimines cannot readily form anhydrides and are therefore less likely to undergo a Beckman rearrangement than 20-oximes; they can be made efficiently from 21-acetoxy-17α-hydroxy-20-ketones; 20-alkoxyimines in particular are stable to alkali but are hydrolysed in good yield by dilute acid. 20-alkoxyimines thus offer nearly all the advantages of 20-semicarbazones and 20-ketals without suffering their disadvantages.

The advantages over the 20-ketals are particularly important as they avoid the necessity for prior hydrolysis of the 21-acyloxy group and the inefficient ketalisation of the resulting 20-oxo-17α:21-diols The process according to the invention is of particular value in the preparation of compounds of the general formula:

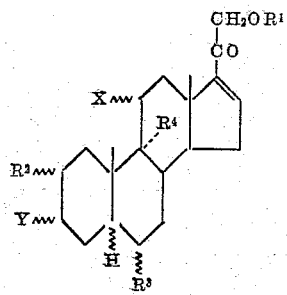

where

R¹ is hydrogen or an acyl group;

R² is hydrogen or an alkyl (e.g. methyl, ethyl, etc.) group;

R³ is hydrogen, an alkyl (e.g. methyl, ethyl, etc.) group or a halogen, e.g. fluorine, atom;

R⁴ is hydrogen or a halogen, e.g. fluorine, atom;

X is hydrogen or a ketonic oxygen atom or a hydroxy group; and

Y is a ketonic oxygen atom or a hydroxy or acyloxy group, together with their Δ⁴, Δ¹:⁴ and Δ⁵ derivatives.

In order that the invention may be well understood, the following examples are given by way of illustration only. Unless otherwise stated, infra-red and ultra-violet spectroscopic data and optical rotations pertain to solutions in bromoform, ethanol and chloroform respectively:

EXAMPLE 1

(a) 21-acetoxy-3:3-ethylenedioxy-17α-hydroxy-5α-pregnane-11:20-dione

4:5α-dihydrocortisone acetate (10 g.) was suspended in a mixture of benzene (360 ml.) and ethylene glycol (80 ml.) containing p-toluenesulphonic acid (50 mg.), and the whole refluxed and stirred for 5.5 hours. The water from the reaction was separated as the azeotrope by means of a Dean and Stark apparatus. The nature of the solid changed from a fine powder to leaflets. A saturated solution of sodium hydrogen carbonate (100 ml.) was added to the cooled mixture, which was then left in the refrigerator for 1 hour and filtered (9.96 gm.), M.P. 268–271° C. The solid was recrystallised from 50% aqueous pyridine (250 ml.) to give the 3-ketal (9.60 g., 87%), M.P. 275–278° C., [α]$_D^{18}$+84° (c. 0.27 in CHCl₃).

The filtrate from the first filtration was evaporated to dryness to give a yellowish solid (1.09 g.). This was recrystallised from aqueous pyridine to give rods (0.42 g.), M.P. 278.5–279° C., bringing the yield to 95%. A second crop was obtained from the first recrystallisation (0.05 g.), M.P. 271–275° C.

(b) 21-acetoxy-3:3-ethylenedioxy-17α-hydroxy-20-methoxyimino-5α-pregnan-11-one

4:5α-dihydrocortisone acetate 3-ethylene ketal (9.5 g.) in pyridine (94 ml.) was treated with the filtered solution of methoxyamine hydrochloride (9.5 g.) in dry pyridine (94 ml.). The whole was left at room temperature for 6 days. On the addition of water to bring the bulk up to 1 litre, prisms of the ketal methoxyimine separated out (9.55 g., 94%), M.P. 204–205° C. [α]$_D^{20}$+42° (c. 0.41 in CHCl₃). An analytical specimen prepared by crystallisation from acetone had the same properties. (Found: C, 65.6; H, 8.3; N, 3.2. C₂₆H₃₉O₇N(477.6) requires C, 65.4; H, 8.2; N, 3.2%.)

(c) 21-acetoxy-3:3-ethylenedioxy-20-methoxyimino-5α-pregn-16-en-11-one

4:5α-dihydrocortisone acetate 3-ethyleneketal-20-methoxyimine (5.0 g.) was dissolved, with stirring, in dry pyridine (50 ml.) and the solution, in an atmosphere of nitrogen, cooled to −40° C. To this was added a solution of redistilled thionyl chloride (2 ml.) in pyridine (50 ml.), which had been prepared under nitrogen also at −40° C. The mixture was stirred for 1 hour; it turned light brown but remained clear of solid. Pouring on to ice precipitated a white solid (4.7 g.), M.P. 125–130° C. λ$_{max}$ 247.5 mμ (ε 12,200). Crystallisation from aqueous pyridine gave prisms (4.02 g.), M.P. 135–140°, λ$_{max}$ 247.5 mμ (ε 14,400) and recrystallising from ether gave three crops of the methoxyimine (3.9 g., 81%), M.P. 149–150° (crystal change 136.5°), [α]$_D^{19}$+49° (c. 0.24 in CHCl₃) λ$_{max}$ 246 mμ (ε 14,500). (Found: C, 68.2; H, 8.1; N, 3.4. C₂₆H₃₇O₆N requires C, 68.0; H, 8.1; N, 3.1%.)

(d) 21-acetoxy-5α-pregn-16-ene-3:11:20-trione

21 - acetoxy - 3:3 - ethylenedioxy - 20 - methoxyimino-5α - pregn - 16 - en - 11 - one (4.3 g.) was dissolved in acetone (215 ml.); 2-N-hydrochloric acid (215 ml.) was added and the mixture left to stand at room temperature for 3 days. The steroid was extracted into chloroform (5 x 30 ml.) and the extract washed with a solution of saturated sodium hydrogen carbonate (50 ml.) and then with water (50 ml.). The extract was then dried and the solvent removed in vacuo to give a yellowish solid (3.28 g.). This was acetylated overnight with pyridine (20 ml.) and acetic anhydride (15 ml.). Pouring the mixture on to ice precipitated 21-acetoxy-5α-pregn-16-ene-3:11:20-trione (3.43 g.). This was recrystallised from ethyl acetate as blades (2.57 g.; 71%) M.P. 197–199° C., [α]$_D^{20}$+85° (c. 0.55 in CHCl₃), λ$_{max}$ 235.5 mμ (ε 9,100). (Found: C, 70.9; H, 7.7. C₂₃H₃₀O₅ (386.5) requires C, 71.5; H, 7.8%.) A further crop (0.278 g.) brought the yield to 79%.

EXAMPLE 2

(a) 3β:21-diacetoxy-17α-hydroxy-20-methoxyimino-5α-pregnan-11-one

3β:21 - diacetoxy - 17α - hydroxy - 5α - pregnane-11:20-dione (18.36 g.) in pyridine (220 ml.) was mixed with methoxyamine hydrochloride (18.0 g.) in pyridine (120 ml.). The course of the reaction was followed polarimetrically and by occasional tests with 2:5-diphenyl-3(4-styryl phenyl)-tetrazolium chloride; from such evidence the reaction appeared to last about 48 hours (when [α]$_D$+19°, approx.), and after 64 hours water was added to precipitate the 20-methoxime in two crops (22.47 and 2.37 g. respectively); the first crop had a double M.P. 137–140° C., and 158–162° C., and the second had M.P. 137–140° C. Crystallisation of a portion of the first crop from benzene-hexane and from pure benzene gave bi-refringent needles M.P. 162–162.5° C. losing their bi-refringence at ca. 100° C., [α]$_D^{18}$+35° (CHCl₃). Found: C, 65.5; H, 8.3; N, 3.0. C₂₆H₃₉O₇N requires C, 65.4; H, 8.2; N, 2.9%.) The rest of the two crops was crystallised before further use from benzene-hexane as needles, M.P. 160–162° C.

(b) 3β:21-diacetoxy-20-methoxyimino-5α-pregn-16-en-11-one

3β:21 - diacetoxy - 17α - hydroxy - 20 - methoxyimino-5α-pregnan-11-one (1.0 g.) in pyridine (10 ml.) under nitrogen was stirred at −40° C. Thionyl chloride (0.4 ml.) and pyridine (10 ml.) were mixed at −40° C. under nitrogen, and run in. The whole mixture became orange and cloudy. Stirring and cooling and the atmosphere were maintained for 1 hour and the mixture was then poured into ice and water. A rather tarry precipitate resulted, but this was got into a friable form by trituration with ethanol. This powder (0.72 g.)

$$\lambda_{max.}\ 246\ m\mu\ (E^{1\%}_{1\ cm.}\ 256)$$

was filtered off and crystallised four times from ethanol, giving 0.325 g., M.P. 145.5–147° C., $[\alpha]_D^{18}+36°$ (CHCl$_3$), $\lambda_{max}$ 246.5 m$\mu$ ($\epsilon$ 14,400). (Found: C, 67.8; H, 8.1; N, 3.3. C$_{26}$H$_{37}$O$_6$N requires C, 67.95; H, 8.1; N, 3.05%.)

(c) *3β:21-dihydroxy-5α-pregn-16-ene-11:20-dione*

3β:21 - diacetoxy - 20 - methoxyimino - 5α - pregn - 16-en-11-one (0.43 g.) was dissolved in warm acetone (42 ml.), cooled, and diluted with 2 N-hydrochloric acid (22 ml.). Some crystals separated at first, but dissolved in time. The reaction was left 3 days at room temperature, and then diluted with aqueous sodium hydrogen carbonate, which precipitated a fine white powder (0.35 g.). It was isolated with ethyl acetate. Paper chromatography and ultra-violet spectroscopy showed that material with the 20-methoxyimine group was still present, so this product was submitted again to the foregoing conditions for hydrolysis. Isolation in a similar way gave the crude diol $$\lambda_{max.}\ 237\ m\mu\ (E^{1\%}_{1\ cm.}\ 193)$$

the absence of a 20-methoxyimino compound being established by paper chromatography.

(d) *3β:21-diacetoxy-5α-preg-16-ene-11:20-dione*

3β:21 - dihydroxy - 5α - pregn - 16 - ene - 11:20 - dione was acetylated overnight at room temperature in acetic anhydride (5 ml.) and pyridine (5 ml.); evaporation left a gum (0.42 g.) that was subjected to chromatography on magnesium trisilicate. Benzene and ethyl acetate (in the ratio 3:1) eluted material (0.38 g.) that crystallized from benzene-hexane as bi-refringent crystals, M.Pp. 65° C. and 118° C. Recrystallization then gave pure 3β:21-diacetoxy-5α-pregn-16-ene-11:20-dione (0.10 g.) with the same M.Pp., $[\alpha]_D^{18}+46°$, $\lambda_{max}$ 235 m$\mu$ ($\epsilon$ 8,600). (Found: C, 70.2; 70.0; H, 8.5, 8.3. C$_{25}$H$_{34}$O$_6$ requires C, 69.7; H, 8.0%.)

EXAMPLE 3

*3β:21-diacetoxy-20-methoxyimino-5α-pregn-16-en-11-one*

3β:21 - diacetoxy - 17α - hydroxy - 20 - methoxyimino-5α-pregnan-11-one (0.2 g.) in dimethylacetamide (2 ml.) under nitrogen was stirred at −30° C. Thionyl chloride (0.08 ml.) and dimethylacetamide (2 ml.) were mixed at −20° C. and run in. The mixture, which had solidified at −30° C., was stirred for 1 hour whilst the temperature rose to −20° C. At this temperature, the mixture melted and the resulting pale yellow solution was stirred for a further 40 mins. during which time the temperature was allowed to rise to −5° C. Pouring into ice and water precipitated a white solid (0.168 g.) M.P. 134–137° C. Its ultra-violet absorption spectrum $$[\lambda_{max.}\ 247\ m\mu\ (E^{1\%}_{1\ cm.}\ 261)]$$

and paper-chromatogram indicated that it was the unsaturated methoxime free from the 17α-hydroxy compound.

EXAMPLE 4

*3β:21-diacetoxy-20-methoxyimino-5α-pregn-16-en-11-one*

3β:21 - diacetoxy - 17α - hydroxy - 20 - methoxyimino-5α-pregnan-11-one (0.2 g.) in collidine (2 ml.) under nitrogen was stirred at −30° C. Thionyl chloride (0.08 ml.) and collidine (2 ml.) were mixed at −30° C. and run in. The yellow suspension was stirred under nitrogen for 1.5 hr. during which time the temperature rose gradually to −5° C. Pouring into ice and hydrochloric acid precipitated a white sticky solid that was extracted into ethyl acetate (2 x 25 ml.). The extracts were combined and washed successively with 2 N-hydrochloric acid (2 x 15 ml.), saturated sodium hydrogen carbonate solution (2 x 15 ml.) and water (2 x 10 ml.) and dried. Removal of the solvent in vacuo left a colourless gum that crystallised readily on trituration with ethanol. Removal of the ethanol left a white crystalline solid containing some gummy material (0.2 g.). Its ultra-violet absorption spectrum $$[\lambda_{max.}\ 247\ m\mu\ (E^{1\%}_{1\ cm.}\ 263)]$$

and paper-chromatogram indicated that it was substantially the Δ$^{16}$-20-methoxyimine.

EXAMPLE 5

*21-acetoxy-3:3-ethylenedioxy-20-methoxyimino-5β:6β-epoxy-pregn-16-en-11-one*

21 - acetoxy - 3:3 - ethylenedioxy - 17α - hydroxy - 20-methoxyimino-5β:6β-epoxypregnan-11-one (0.2 g.) in pyridine (2 ml.) under nitrogen was stirred at −35° C. Thionyl chloride (0.08 ml.) and pyridine (2 ml.) were mixed, at −35° C. under nitrogen and run in. The reaction mixture, which became orange, was stirred under nitrogen at −35° C. for 1.5 hr. Pouring into ice and water precipitated an off-white solid (0.15 g.), the ultra-violet spectrum of which indicated the presence of the Δ$^{16}$-20-methoxyimine system;

$$[\lambda_{max.}\ 247.5\ m\mu\ (E^{1\%}_{1\ cm.}\ 256)]$$

We claim:

1. In a process for the preparation of 16:17 dehydro-20-oxo steroids by dehydrating 17-hydroxy-20-oxo steroids, the step which comprises protecting the 20-oxo group prior to dehydration by reacting said 17-hydroxy-20-oxo-steroid with a salt of a compound H$_2$NOR, where R is an alkyl group containing 1–4 carbon atoms, in the presence of a tertiary amine having a pKa value of not greater than 7.6 to form a 20-alkoxyimino derivative thereof.

2. The process defined in claim 1 in which the alkoxyamine is methoxyamine.

3. The process as defined in claim 1 in which the reaction is carried out in a homogeneous liquid phase.

4. The process as defined in claim 1 in which the tertiary amine is a water-miscible tertiary amine.

5. The process as defined in claim 1 in which the tertiary amine is pyridine.

6. The process as defined in claim 1 in which, where the 17-hydroxy-20-oxo steroid contains a 3-oxo group, a 3-ketal group is formed prior to forming the 20-alkoxyimino group.

7. A process as defined in claim 1 in which the 16:17 dehydro-20-oxo steroid prepared is a compound selected from compounds of the general formula:

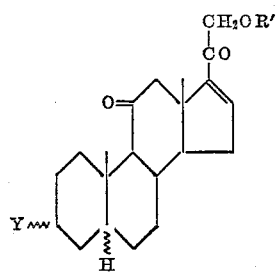

where R' is selected from the group consisting of hydrogen and acyl groups; and Y is selected from the group consisting of ketonic oxygen, hydroxy and acyloxy groups.

8. The process as defined in claim 1 in which the 16:17 dehydro-20-oxo steroid is selected from the group consisting of 3β:21-dihydroxy-5α-pregn-16-ene-11:20-dione, 21-hydroxy-5α-pregn-16-ene-3:11:20 trione and 21-acetoxy-5α-pregn-16-ene-3:11:20-trione.

9. The process as defined in claim 1 in which the dehydration of the 17-hydroxy-20-alkoxyimino steroid is effected by reaction with thionyl chloride in the presence of a tertiary organic base.

10. The process as defined in claim 9 in which the tertiary organic base is selected from the group consisting of pyridine, quinoline, collidine, N-methyl morpholine and di-N-substituted amides.

11. The process as defined in claim 9 in which the dehydration is effected at a temperature below 4° C.

12. The process as defined in claim 1 in which the dehydrated steroid is subsequently hydrolysed under mild conditions to reform the 20-oxo group.

13. The process as defined in claim 12 in which the hydrolysis is brought about using dilute acid.

14. The process as defined in claim 12 in which the steroid substance bears oxo groups other than at the 20-position and the hydrolysis is carried out in the presence of a carbonyl compound selected from the group consisting of acetone and methyl ethyl ketone.

No references cited.